(12) United States Patent
Garg et al.

(10) Patent No.: US 11,443,311 B2
(45) Date of Patent: Sep. 13, 2022

(54) METHOD AND SYSTEM FOR BLOCKCHAIN TRANSACTION CONFIRMATION FOR SMALL MERCHANTS

(71) Applicant: MASTERCARD INTERNATIONAL INCORPORATED, Purchase, NY (US)

(72) Inventors: Chandan Garg, Haryana (IN);
Awinash Pandey, Haryana (IN);
Saugandh Datta, Greater Noida (IN);
Sandeep Parvathareddy, Andhra Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 10 days.

(21) Appl. No.: 16/734,830

(22) Filed: Jan. 6, 2020

(65) Prior Publication Data
US 2021/0209592 A1 Jul. 8, 2021

(51) Int. Cl.
*G06Q 20/38* (2012.01)
*G06Q 20/08* (2012.01)
*H04L 9/06* (2006.01)

(52) U.S. Cl.
CPC ..... *G06Q 20/3829* (2013.01); *G06Q 20/0855* (2013.01); *G06Q 20/388* (2013.01); *H04L 9/0637* (2013.01)

(58) Field of Classification Search
CPC .......... G06Q 20/3829; G06Q 20/0855; G06Q 20/388; H04L 9/0637
USPC ....................................................... 705/76
See application file for complete search history.

(56) References Cited

U.S. PATENT DOCUMENTS

| 9,397,985 B1 * | 7/2016 | Seger et al. |
| 2018/0101848 A1 * | 4/2018 | Castagna et al. |
| 2018/0330346 A1 * | 11/2018 | Grassadonia .......... G06Q 20/10 |

FOREIGN PATENT DOCUMENTS

JP 4309479 B2 * 8/2009 ........... G06Q 20/363

* cited by examiner

*Primary Examiner* — James D Nigh
*Assistant Examiner* — Yin Y Choi
(74) *Attorney, Agent, or Firm* — Panitch Schwarze Belisario & Nadel LLP

(57) ABSTRACT

A method for facilitating payment transactions for offline merchants through a third party service provider includes: receiving, by processing server, a confirmation message for a payment transaction from a computing device including a merchant identifier, consumer identifier, and transaction amount; generating, by the processing server, a notification message including the merchant identifier, consumer identifier, and transaction amount; encrypting, by the processing server, the notification message using a public key of a first cryptographic key pair; transmitting, by the processing server, the encrypted notification message to the computing device; receiving, by an encryption device, the encrypted notification message from the computing device; decrypting, by the encryption device, the encrypted notification message using a private key of the first cryptographic key pair; and displaying, by a display interfaced with the encryption device, a confirmation message including the consumer identifier included in the decrypted notification message.

12 Claims, 5 Drawing Sheets

METHOD AND SYSTEM FOR BLOCKCHAIN TRANSACTION CONFIRMATION FOR SMALL MERCHANTS

FIELD

The present disclosure relates to facilitating payment transactions for offline merchants through a third-party service provider, specifically the use of an encryption device at a merchant that can provide information regarding a payment transaction via a consumer computing device without requiring an active Internet connection.

BACKGROUND

Merchants can be located practically anywhere in the world. For merchants that are located in remote locations, transactions are often limited to using cash and other physical forms of payment that can be processed and handled offline without an active connection to the Internet or a payment network. These types of merchants may miss out on potential sales to consumers that do not carry physical forms of payments and instead rely on payment cards and other online-based methods.

Similarly, small businesses may lack the resources to purchase, operate, and maintain computing systems that can operate as a point of sale, or to also maintain an active connection to the Internet or a payment network to facilitate use of such systems. As a result, these businesses will typically restrict transactions to using cash or other physical forms of payment that can be processed offline. In such instances, business may also lose out on potential customers that desire card-based transactions.

Some point of sale devices may be configured to perform on-behalf processing for an issuer when offline, but these devices are also configured to upload transaction data for any such transactions once a connection is available. Thus, existing solutions are configured to operate only in temporary situations, and in a manner that delays transaction data being provided to an issuer or acquirer, potentially causing issues for transaction accounts for consumers and merchants. Thus, there is a need for a system that can enable a merchant to participate in an account-based payment transaction without an active connection to the Internet or a payment network.

SUMMARY

The present disclosure provides a description of systems and methods for facilitating payment transactions for offline merchants through a third-party service provider. A third-party service provider, such as an Internet service provider or other entity, provides a merchant with an encryption device, which may be a standalone computing device or may be a protected application program that can be executed by a merchant's existing computing device. Using their personal computing device, a consumer can receive identifying information from the merchant, such as through manual input or via a direct transmission from the encryption device. The personal computing device can initiate a payment to the merchant using the received information and provide data according therewith to the third-party service provider. The third-party service provider generates an encrypted message with payment details that confirm the payment and provides the encrypted message back to the consumer's computing device. The consumer's computing device can transmit the encrypted message to the encryption device, which can decrypt the message and present data associated therewith to the merchant. Through this decrypted data the merchant can see that the consumer made a payment to the merchant and for the appropriate amount and finalize a transaction accordingly. The result is a transaction involving immediate payment to the merchant, where the merchant does not need or utilize an active connection to the Internet, a payment network, or any communication network aside from exchanging communication directly with the consumer's computing device. Thus, the methods and systems discussed herein provide for offline transactions for a merchant without the drawbacks of traditional solutions.

A method for facilitating payment transactions for offline merchants through a third party service provider includes: receiving, by a receiver of a processing server, a confirmation message for a payment transaction from a computing device, where the confirmation message includes at least a merchant identifier, a consumer identifier, and a transaction amount; generating, by a processor of the processing server, a notification message, where the notification message includes at least the merchant identifier, the consumer identifier, and the transaction amount; encrypting, by the processor of the processing server, the notification message using a public key of a first cryptographic key pair; transmitting, by a transmitter of the processing server, the encrypted notification message to the computing device; receiving, by a receiver of an encryption device, the encrypted notification message from the computing device; decrypting, by a processor of the encryption device, the encrypted notification message using a private key of the first cryptographic key pair; and displaying, by a display interfaced with the encryption device, a confirmation message including at least the consumer identifier included in the decrypted notification message.

A system for facilitating payment transactions for offline merchants through a third party service provider includes: a computing device; a processing server including a receiver receiving a confirmation message for a payment transaction from a computing device, where the confirmation message includes at least a merchant identifier, a consumer identifier, and a transaction amount, a processor generating a notification message, where the notification message includes at least the merchant identifier, the consumer identifier, and the transaction amount, and encrypting the notification message using a public key of a first cryptographic key pair, and a transmitter transmitting the encrypted notification message to the computing device; an encryption device including a receiver receiving the encrypted notification message from the computing device, and a processor decrypting the encrypted notification message using a private key of the first cryptographic key pair; and a display interfaced with the encryption device displaying a confirmation message including at least the consumer identifier included in the decrypted notification message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
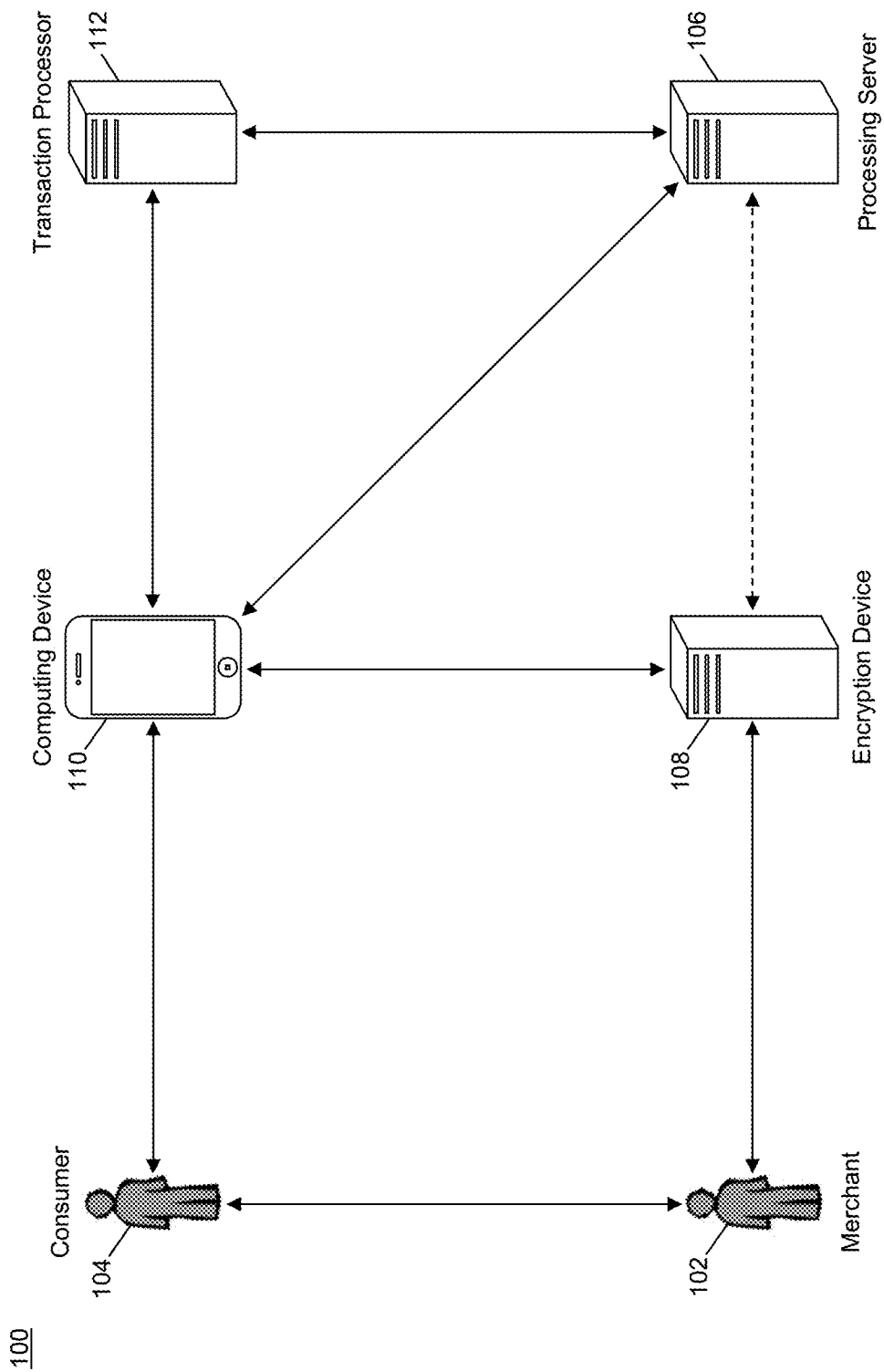
FIG. 1 is a block diagram illustrating a high-level system architecture for facilitating payment transactions for offline merchants in accordance with exemplary embodiments.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Facilitating Payment Transactions for Offline Merchants

FIG. 1 illustrates a system 100 for facilitating payment transactions for merchants that lack active communication connections to the Internet, payment networks, or other communication networks through a third-party service provider.

In the system 100, a merchant 102 may want to conduct a payment transaction with a consumer 104. The consumer 104 may want to utilize an electronic-based payment method to fund the payment transaction, such as a transaction account issued by an issuing financial institution, or cryptographic currency that is processed using a blockchain. The merchant 102 may lack an active communication connection to a payment network, the Internet, or other communication network to facilitate such a payment transaction directly with the consumer 104. To facilitate electronic-based payment transactions for the merchant 102, the system 100 may include a platform provided by a third-party service provider through a processing server 106 and an encryption device 108. The processing server 106 and encryption device 108 may be specially configured computing devices, such as the computing device 200 of FIG. 2 or the computer system 500 of FIG. 5, discussed in more detail below.

The third-party service provider may be any entity that wants to facilitate payment transactions for the merchant 102 and that has a transaction account suitable for receiving payment via electronic payment transactions from the consumer 104. The third-party service provider may be, for instance, a bank or other financial institution, an Internet service provider, a social network operator, another merchant, or other suitable entity. The third-party service provider may have a processing server 106 that is configured to perform the functions discussed herein for confirming payment transactions and providing encrypted messages. The processing server 106 may have a public key of a cryptographic key pair stored therein used to encrypt messages. The encryption device 108 may have the private key of the cryptographic key pair stored therein to decrypt messages encrypted by the processing server 106 using the corresponding public key. The encryption device 108 may be physically provided to the merchant 102, where the encryption device 108 may be physically situated at a physical location of the merchant 102 and in operation at the merchant 102.

The consumer 104 may be in possession of a computing device 110. The computing device 110 may be any type of computing device that is specially configured and suitable for performing the functions discussed herein, such as a specially configured smart phone, cellular phone, tablet computer, notebook computer, laptop computer, smart watch, etc. To perform the payment transaction with the merchant 102, the consumer 104 may receive, in their computing device 110, at least a merchant identifier and a transaction amount for payment to the merchant 102. The merchant identifier may be a unique value that is associated with the merchant 102, such as for use in identifying a transaction account or other information of the merchant 102. The transaction amount may be a payment amount that is to be paid to the merchant 102 by the consumer 104 via the electronic payment transaction. In some cases, the merchant identifier and/or transaction amount may be input into the computing device 110 using an input device interfaced therewith, such as via a keyboard. In other cases, the encryption device 108 may establish a direct communication channel with the computing device 110, such as using near field communication, Bluetooth, radio frequency, or other suitable communication method, where the merchant identifier and/or transaction amount may be transmitted to the computing device 110. For example, the encryption device 108 may have a terminal for entry of the transaction amount by the merchant 102, and the encryption device 108 may transmit the transaction amount and a merchant identifier (e.g., supplied by the processing server 106 or service provider with the private key) to the computing device 110.

The computing device 110 may receive the data and may, via an instruction from the consumer 104, initiate a payment transaction for the transaction amount. The payment may be made to the third-party service provider, where, as part of the transaction data, the consumer 104 may provide the merchant identifier. The payment transaction may be processed by a transaction processor 112, such as a card-based payment network, a blockchain network, etc. The payment transaction may be for the transaction amount and may be funded by a transaction account of the consumer 104 selected thereby. The payment transaction may be initiated using an application program or web page accessed by the computing device 110. In an exemplary embodiment, the computing device 110 may include an application program associated with the third-party service provider, where the transaction amount and merchant identifier may be input thereto, and a transaction account selected for payment. The merchant identifier, transaction amount, and account data for the selected transaction account may be transmitted to the processing server 106 using a suitable communication network and method, such as via the Internet. The account data may include a payment account number and other associated data for a fiat-based transaction account, a digital signature and unspent transaction outputs for a blockchain account, or other data dependent on the type of currency and payment being made. The processing server 106 may receive the data from the computing device 110 and submit a transaction to the transaction processor 112 for payment of the transaction amount from the consumer's selected transaction account, identified via the supplied account data, to a transaction account for the merchant 102. In some cases, the processing server 106 may provide account data for its own (e.g., or the merchant's, as applicable, such as may be identified using the merchant identifier) transaction account to the computing device 110, either directly or via the encryption device 108, where the computing device 110 may submit the payment transaction to the transaction processor 112. The transaction processor 112 may, in some embodiments, provide a confirmation to the processing server 106 and/or computing device 110 after successful processing of the payment from the consumer 104 to the service provider or the merchant 102, as applicable.

In embodiments where the computing device 110 initiates the payment transaction with the transaction processor 112, the processing server 106 may receive a notification regarding payment to a transaction account associated therewith (e.g., issued to the service provider or the merchant 102) from the computing device 110 directly or the transaction processor 112. The notification message may include at least the merchant identifier, transaction amount, and a consumer identifier. The consumer identifier may be a unique value associated with the consumer 104 and/or the computing device 110, such as a username, e-mail address, telephone number, registration number, device identifier, etc.

In some embodiments where the computing device 110 transmits a notification message to the processing server 106, the notification message may be encrypted. In such embodiments, the processing server 106 may provide a public key to the computing device 110 (e.g., via the application program) that is of a cryptographic key pair for which the processing server 106 has the corresponding private key. In some cases, the cryptographic key pair may be different than the key pair for which the encryption device 108 has the private key. In other cases, the cryptographic key pair may be the same (e.g., where the encryption device 108 and processing server 106 both have the private key), but where salts or other data may be used in the encryption of messages with the public key thereof, as discussed in more detail below. In these embodiments, the processing server 106 may decrypt notification messages and other data received from the computing device 110 using the appropriate private key.

Once the processing server 106 confirms payment from the consumer 104 for a transaction with the merchant 102, the processing server 106 may generate a notification message for the merchant 102. The notification message may include at least the transaction amount, merchant identifier, and consumer identifier. The processing server 106 may then encrypt the notification message using the public key of the cryptographic key pair shared with the encryption device 108. The processing server 106 may then electronically transmit the encrypted message to the computing device 110. As the computing device 110 does not possess the private key for that cryptographic key pair, the computing device 110 may be unable to decrypt the encrypted message, such as to modify the transaction amount or otherwise conduct fraud on the transaction. The computing device 110 may receive the encrypted message, which it may then forward on to the encryption device 108 using the established direct communication channel therewith.

The encryption device 108 receives the encrypted message from the computing device 110 and then decrypts the encrypted message using the private key of the cryptographic key pair as stored therein. The encryption device 108 may validate that the merchant identifier included in the decrypted message corresponds to the merchant 102. The encryption device 108 may be interfaced with a display device and may display, on the display device, the consumer identifier and transaction amount for the confirmed transaction of payment to the merchant's (e.g., or service provider's) transaction account. The merchant 102 may view the display to confirm that the consumer 104 participating in the transaction made the payment, such as by providing the consumer identifier thereto (e.g., after display of the decrypted data or earlier in the transaction, such as when obtaining the merchant identifier from the encryption device 108), and confirm that the payment was for the agreed-upon transaction amount. If there is any discrepancy in the data, the merchant 102 may discuss the situation with the consumer 104, such as if the payment was made for less than the transaction amount, such as to modify the goods or services being provided to the consumer 104.

In embodiments where a single cryptographic key pair is used for encryption and decryption of communications between the processing server 106 and both the encryption device 108 and the computing device 110, a salt may be used. A salt is a value that may be provided in an encryption algorithm, which may modify the output such that the encrypted message may only be properly decrypted when provided with the correct salt. In the system 100, the computing device 110 may use a timestamp for the payment transaction or other data therefrom for the salt when encrypting messages for transmission to the processing server 106, as the processing server 106 may receive such data in a confirmation from the transaction processor 112 and accordingly be able to provide the correct salt when decrypting the encrypted messages. The processing server 102 and encryption device 108 may have a salt predetermined, such as loaded in memory of the encryption device 108 prior to provisioning to the merchant 102. In such embodiments, a single cryptographic key pair may be utilized with the salts, where the computing device 110 may still be unable to decrypt data directed to the encryption device 108 or to generate an encrypted message posing as the processing server 106, to prevent fraud.

The methods and systems discussed herein enable a merchant 102 to receive payment for a transaction through an electronic transaction without the merchant 102 having an active connection to any communication network, through a direct connection to the consumer's computing device 110. The use of encryption ensures that privacy and security of the transaction is maintained, and the merchant 102 can receive information regarding the payment to confirm that the consumer 104 made a proper electronic payment to the merchant 102 or appointed entity or account. Thus, a merchant receives payment as part of an electronic transaction while entirely offline, allowing a consumer 104 to pay using any desired method and allowing the merchant 102 to receive payment with only a single device provided by the third-party service provider and no active connections to the Internet or payment networks.

Computing System

Figure 2:
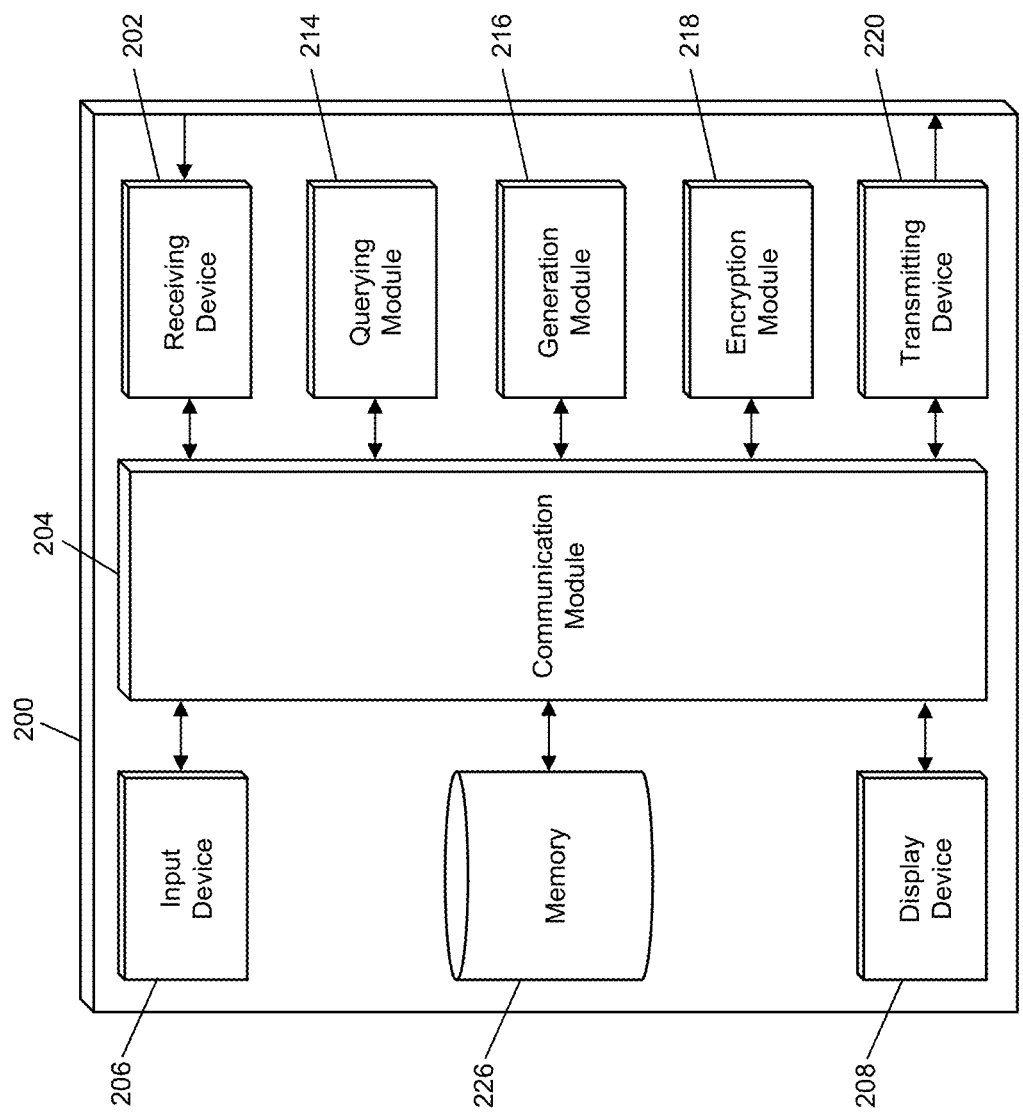
FIG. 2 is a block diagram illustrating the processing server of the system of FIG. 1 for facilitating payment transactions for offline merchants in accordance with exemplary embodiments.

FIG. 2 illustrates an embodiment of a computing system 200, such as may serve as the processing server 106, encryption device 108, and/or computing device 110 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from processing servers 106, encryption devices 108, computing devices 110, transaction processors 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by processing servers 106 and computing devices 110 that may be superimposed or otherwise encoded with encrypted messages, which may be decrypted using a private key of an appropriate cryptographic key pair, where the message was encrypted using the corresponding public key, or other data such as transaction account information. The receiving device 202 may also be configured to receive data signals electronically transmitted by encryption devices 108 or computing devices 110, which may be superimposed or otherwise encoded with an encrypted message or other data being exchanged to facilitate a payment transaction, such as a consumer identifier, merchant identifier, and transaction amount. The receiving device 202 may also be configured to receive data signals electronically transmitted by transaction processors 112, which may be superimposed or otherwise encoded with data regarding confirmation of a payment transaction, such as data included therein, transaction amounts, timestamps, etc.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, encryption module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may also include a memory 226. The memory 226 may be configured to store data for use by the computing system 200 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, cryptographic keys, salts, nonces, communication information, message generation rules, encryption algorithms, consumer identifiers, merchant identifiers, transaction data, transaction account information, etc.

The computing system 200 may also include or be otherwise interfaced with one or more input devices 206. The input devices 206 may be internal to the computing system 200 or external to the computing system 200 and connected thereto via one or more connections (e.g., wired or wireless) for the transmission of data to and/or from. The input devices 206 may be configured to receive input from a user of the computing system 200, which may be provided to another module or engine of the computing system 200 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive merchant identifiers, consumer identifiers, transaction amounts, user instructions, etc.

The computing system 200 may also include or be otherwise interfaced with a display device 208. The display device 208 may be internal to the computing system 200 or external to the computing system 200 and connected thereto via one or more connections (e.g., wired or wireless) for the transmission of data to and/or from. The display device 208 may be configured to display data to a user of the computing system 200. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the computing system 200 may include multiple display devices 208. The display device 208 may be configured to, for example, display merchant identifiers, consumer identifiers, transaction amounts, user prompts, transaction confirmation data, etc.

The computing system 200 may include a querying module 214. The querying module 214 may be configured to execute queries on databases to identify information. The querying module 214 may receive one or more data values or query strings and may execute a query string based thereon on an indicated database, such as the memory 226 of the computing system 200 to identify information stored therein. The querying module 214 may then output the identified information to an appropriate engine or module of the computing system 200 as necessary. The querying module 214 may, for example, execute a query on the memory 226 to identify a merchant identifier and transaction amount stored therein for inclusion in a message transmitted to another computing system 200, or to identify a public key for encryption of a data message.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate new notification messages and other data messages, which may be encrypted prior to transmission to other computing systems 200 as discussed herein.

The computing system 200 may also include an encryption module 218. The encryption module 218 may be configured to perform encryption and decryption operations for the computing system 200 as part of the functions discussed herein. The encryption module 218 may receive an instruction as input, may encrypt or decrypt a data message in accordance with the instructions, and output the data to another module or engine of the computing system 200. In some cases, the input may include the data to be encrypted or decrypted and/or the public or private key to use for the function. In other cases, the encryption module 218 may be configured to identify such data, such as by inputting an instruction to the querying module 214 to query such data from the memory 226 of the computing system.

The computing system 200 may also include a transmitting device 220. The transmitting device 220 may be configured to transmit data over one or more networks via one or more network protocols. In some instances, the transmitting device 220 may be configured to transmit data to processing servers 106, encryption devices 108, computing devices 110, transaction processors 112, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to encryption devices 108 that are superimposed or otherwise encoded with requests for merchant data, encrypted messages from processing servers 106, etc. The transmitting device 220 may also be configured to electronically transmit data signals to processing servers 106, which may be superimposed or otherwise encoded with encrypted messages, transaction data, transaction confirmations, etc. The transmitting device 220 may be configured to electronically transmit data signals to computing devices 110 that are superimposed or otherwise encoded with merchant data, encrypted messages, transaction confirmations, etc. The transmitting device 220 may be further configured to electronically transmits data signals to transaction processors 112 that are superimposed or otherwise encoded with transaction data for the initiation of a payment transaction for payments from a consumer's transaction account to a transaction account of the merchant 102 and/or the third-party service provider.

Process for Facilitating Payment Transactions for Offline Merchants

Figure 3:
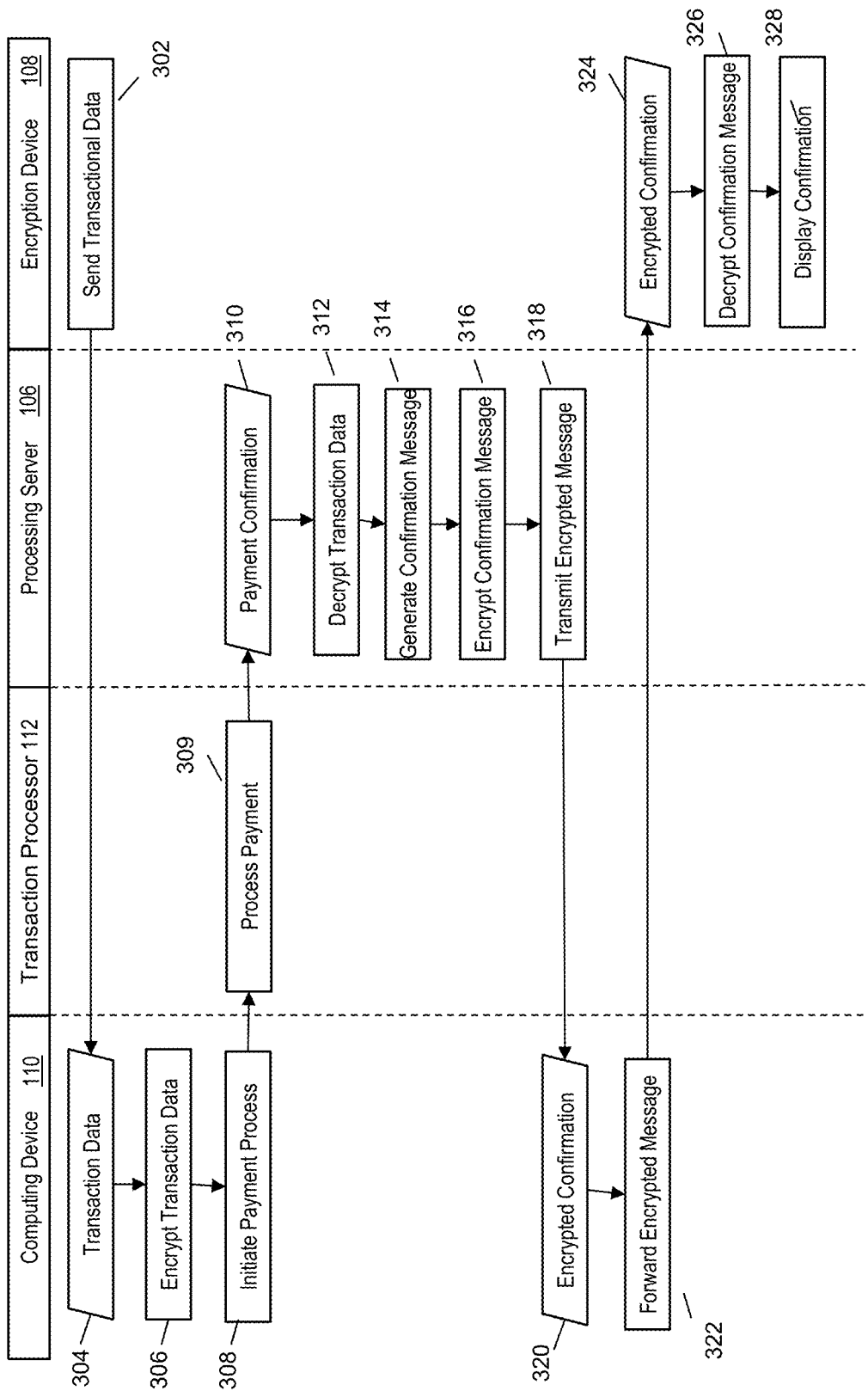
FIG. 3 is a process flow illustrating a method for performing a payment transaction for an offline merchant using an encryption device in the system of FIG. 1 in accordance with exemplary embodiments.

FIG. 3 illustrates a process for the facilitation of an electronic payment transaction from a consumer 104 to a merchant 102 in the system 100 through the use of the processing server 106 and encryption device 108 for offline merchants.

In step 302, the encryption device 108 may electronically transmit (e.g., via a transmitting device 220) transaction data to the computing device 110 using a direct communication channel established therewith, such as via near field communication. The transaction data may include at least a merchant identifier associated with the merchant 102 and a transaction amount for a payment transaction to be initiated by the consumer 104. In step 304, the computing device 110 may receive (e.g., via a receiving device 202) the transaction data from the encryption device 108. In step 306, the computing device 110 may encrypt (e.g., via an encryption module 218) the merchant identifier received from the encryption device 108 and a consumer identifier associated with the consumer 104 and/or computing device 110, such as stored (e.g., in a memory 226) in the computing device 110.

In step 308, the computing device 110 may initiate (e.g., via a transmitting device 220) a payment transaction for payment of the received transaction amount to the merchant 102 or a specified account associated therewith. In some embodiments, the account may be specified through the merchant identifier. In other embodiments, additional data regarding the account may be received in the transaction data provided by the encryption device 108. The computing device 110 may initiate the payment transaction with the transaction processor 112, which may process the payment transaction using traditional methods and systems. In step 310, the processing server 106 may receive (e.g., via a receiving device 202) a payment confirmation from the transaction processor 112 that processes the payment in step 309 where the payment confirmation may include the transaction amount and account data for the transaction account to which the payment was made. The payment confirmation may also include the encrypted transaction data, which was encrypted by the computing device 110 in step 306.

In step 312, the processing server 106 may decrypt (e.g., via an encryption module 218) the encrypted transaction data using a private key stored (e.g., in a memory 226) in the processing server 106. The processing server 106 may obtain the merchant identifier and consumer identifier and, in step 314, may generate (e.g., via a generation module 216) a notification (or confirmation) message for the payment transaction. The notification message may include at least the merchant identifier and consumer identifier decrypted from the transaction data, as well as the transaction amount from the payment confirmation. In step 316, the processing server 106 may encrypt (e.g., via an encryption module 218) the notification message using a public key of a cryptographic key pair stored (e.g., in a memory 226) in the processing server 106, where the encryption device 108 possess the corresponding private key. In step 318, the processing server 106 may transmit (e.g., via a transmitting device 220) the encrypted notification message to the computing device 110 using a suitable communication network and method.

In step 320, the computing device 110 may receive (e.g., via a receiving device 202) the encrypted notification message. In step 322, the computing device 110 may forward (e.g., via a transmitting device 220) the encrypted notification message to the encryption device 108 using the direct communication channel established therewith. In step 324, the encryption device 108 may receive (e.g., via a receiving device 202) the encrypted notification message. In step 326, the encryption device 108 may decrypt (e.g., via an encryption module 218) the encrypted notification message using the private key that corresponds to the public key used by the processing server 106 in the cryptographic key pair. In step 328, the consumer identifier and transaction amount in the decrypted notification message may be displayed (e.g., via a display device 208) to the merchant 102, where the merchant 102 can proceed with their interaction with the consumer 104 accordingly.

Exemplary Method for Facilitating Payment Transactions for Offline Merchants

Figure 4:
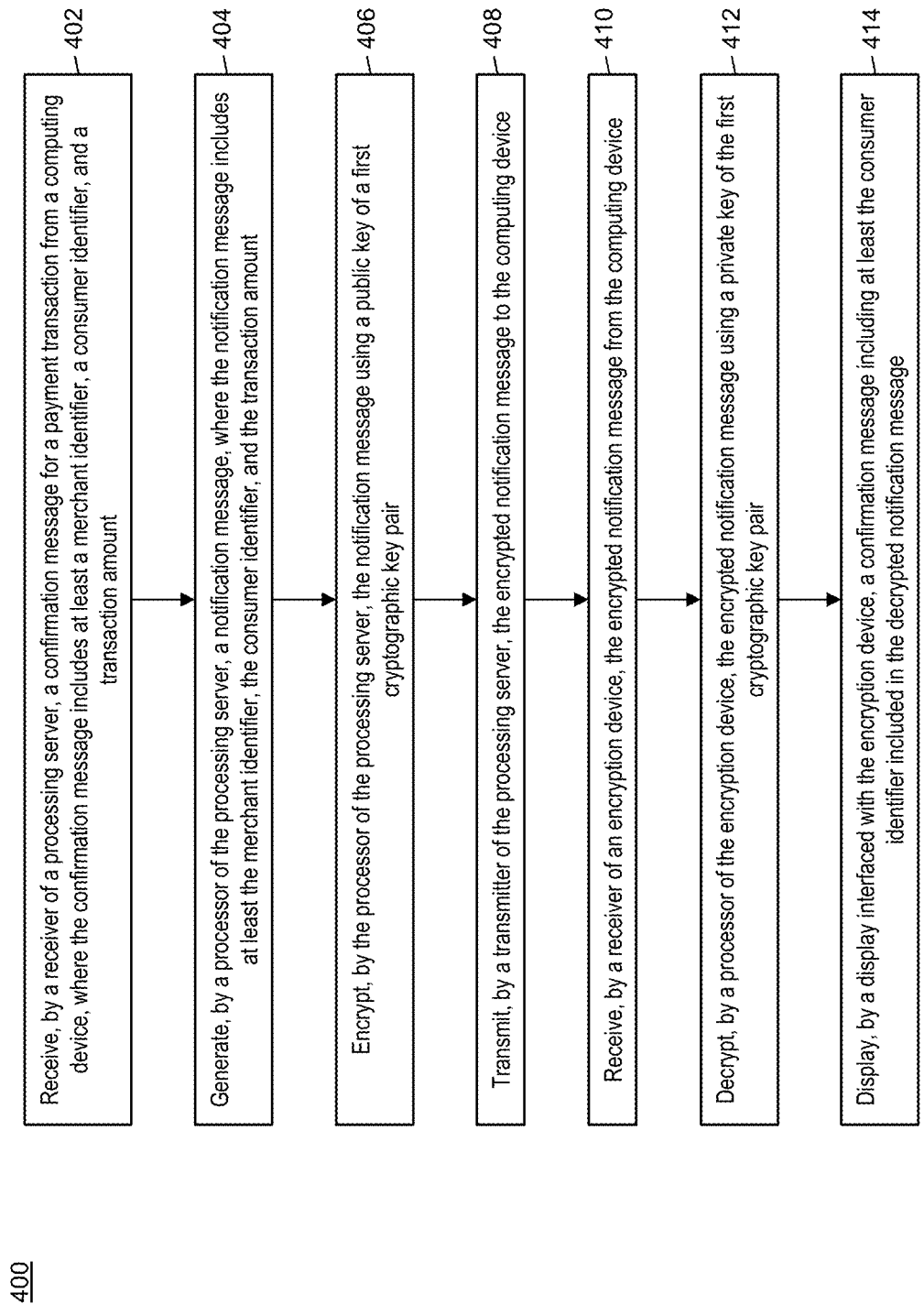
FIG. 4 is a flow chart illustrating an exemplary method for facilitating payment transactions for offline merchants through a third party service provider in accordance with exemplary embodiments.

FIG. 4 illustrates a method 400 for facilitating a payment transaction for an offline merchant through a user computing device and a third-party service provider via encrypted messaging.

In step 402, a confirmation message for a payment transaction may be received by a receiver (e.g., receiving device 202) of a processing server (e.g., the processing server 106) from a computing device (e.g., computing device 110), where the confirmation message includes at least a merchant identifier, a consumer identifier, and a transaction amount. In step 404, a notification message may be generated by a processor (e.g., generation module 216) of the processing server, where the notification message includes at least the merchant identifier, the consumer identifier, and the transaction amount. In step 406, the notification message may be encrypted by the processor (e.g., encryption module 218) of the processing server using a public key of a first cryptographic key pair.

In step 408, the encrypted notification message may be transmitted by a transmitter (e.g., transmitting device 220) of the processing server to the computing device. In step 410, the encrypted notification message may be received by a receiver (e.g., receiving device 202) of an encryption device (e.g., the encryption device 108) from the computing device. In step 412, the encrypted notification message may be decrypted by a processor (e.g., encryption module 218) of the encryption device using a private key of the first cryptographic key pair. In step 414, a confirmation message including at least the consumer identifier included in the decrypted notification message may be displayed by a display (e.g., display device 208) interfaced with the encryption device.

In one embodiment, the merchant identifier and consumer identifier included in the confirmation message may be encrypted using a public key of a second cryptographic key pair; and the method 400 may further including decrypting, by the processor of the processing server, the encrypted merchant identifier and consumer identifier using a private key of the second cryptographic key pair. In some embodiments, the notification message may further include a timestamp. In one embodiment, the method 400 may also include electronically transmitting, by the computing device, the encrypted notification message to the encryption device.

In some embodiments, a first timestamp representing a time of the payment transaction may be used as a salt in encrypting the notification message. In a further embodiment, the merchant identifier and consumer identifier included in the confirmation message may be encrypted using the public key of the first cryptographic key pair and a second timestamp as a salt and the method 400 may further include decrypting, by the processor of the processing server, the encrypted merchant identifier and consumer identifier using the private key of the first cryptographic key pair. In one embodiment, the encryption device may not have an active connection to a communication network. In some embodiments, the payment transaction may be a blockchain transaction.

Computer System Architecture

Figure 5:
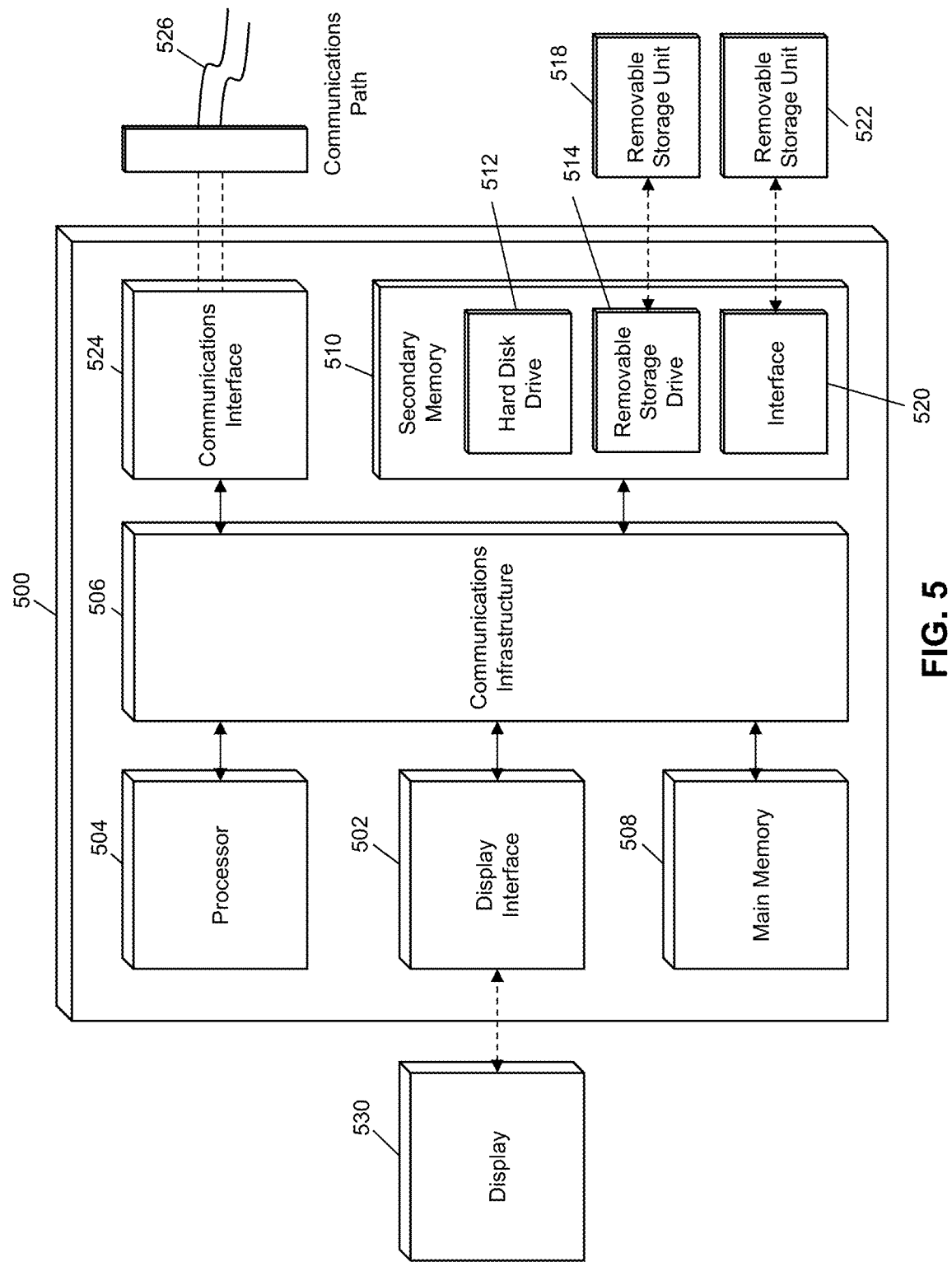
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 106, encryption device 108, and computing device 110 of FIG. 1 and the computing system 200 of FIG. 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating payment transactions for offline merchants through a third-party service provider. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating payment transactions for offline merchants through a third-party service provider, comprising:

generating, by a processor of an encryption device of an offline merchant, a data message including a merchant identifier and a transaction amount;

transmitting, by a transmitter of the encryption device, the data message to a computing device over a direct communication channel;

receiving, by a receiver of a processing server from a payment network, which is different from the direct communication channel, a first confirmation message for a payment transaction from a the computing device, where the first confirmation message includes at least the merchant identifier, a consumer identifier, and the transaction amount transmitted to the computing device by the encryption device, the first confirmation message being encrypted according to a first encryption key pair shared between the processing server and the computing device, and wherein the encryption device is offline relative to the payment network;

decrypting, by a processor of the processing server, the encrypted merchant identifier and consumer identifier using a private key of the first cryptographic key pair;

generating, by the processor of the processing server, a notification message, where the notification message includes at least the merchant identifier, the consumer identifier, and the transaction amount;

encrypting, by the processor of the processing server, the notification message using a public key of a second cryptographic key pair shared between the processing server and the encryption device;

transmitting, by a transmitter of the processing server, the encrypted notification message to the computing device over the payment network;

receiving, by a receiver of the encryption device, the encrypted notification message from the computing device over the direct communication channel;

decrypting, by a the processor of the encryption device, the encrypted notification message using a private key of the second cryptographic key pair; and displaying, by a display interfaced with the encryption device, a second confirmation message including at least the consumer identifier included in the decrypted notification message.

2. The method of claim 1, wherein
the merchant identifier and consumer identifier included in the confirmation message are encrypted using a public key of the first cryptographic key pair.

3. The method of claim 1, wherein the notification message further includes a timestamp.

4. The method of claim 1, wherein a first timestamp representing a time of the payment transaction is used as a salt in encrypting the notification message.

5. The method of claim 1, further comprising:
electronically transmitting, by the computing device, the encrypted notification message generated by the processing server to the encryption device.

6. The method of claim 1, wherein the payment network includes a blockchain and the payment transaction is a blockchain transaction.

7. A system for facilitating payment transactions for offline merchants through a third-party service provider, comprising:
an encryption device associated of an offline merchant, the encryption device including:
a processor generating a data message including a merchant identifier and a transaction amount; and
a transmitter transmitting the data message to a computing device over a direct communication channel;
a processing server including
a receiver receiving a first confirmation message for a payment transaction from a payment network, which is different from the direct communication channel, where the first confirmation message includes at least a merchant identifier, a consumer identifier, and a transaction amount transmitted to the computing device by the encryption device, the first confirmation message being encrypted according to a first encryption key pair shared between the processing server and the computing device, and wherein the encryption device is offline relative to the payment network;
a processor
decrypting the encrypted merchant identifier and consumer identifier using a private key of the first cryptographic key pair;
generating a notification message, where the notification message includes at least the merchant identifier, the consumer identifier, and the transaction amount, and
encrypting the notification message using a public key of a second cryptographic key pair shared between the processing server and the encryption device, and
a transmitter transmitting the encrypted notification message to the computing device over the payment network;
the encryption device further including
a receiver receiving the encrypted notification message from the computing device over the direct communication channel, and
a processor decrypting the encrypted notification message using a private key of the second cryptographic key pair; and
a display interfaced with the encryption device displaying a second confirmation message including at least the consumer identifier included in the decrypted notification message.

8. The system of claim 7, wherein
the merchant identifier and consumer identifier included in the confirmation message are encrypted using a public key of the first cryptographic key pair.

9. The system of claim 7, wherein the notification message further includes a timestamp.

10. The system of claim 7, wherein a first timestamp representing a time of the payment transaction is used as a salt in encrypting the notification message.

11. The system of claim 7, wherein the computing device electronically transmits the encrypted notification message generated by the processing server to the encryption device.

12. The system of claim 7, wherein the payment network includes a blockchain and the payment transaction is a blockchain transaction.

* * * * *